(12) United States Patent
Castaneda et al.

(10) Patent No.: US 11,060,764 B2
(45) Date of Patent: Jul. 13, 2021

(54) ON-DEMAND HEATER AND TEMPERATURE CONTROL SYSTEM AND RELATED PROCESS

(71) Applicant: Graco Fluid Handling (H) Inc., Minneapolis, MN (US)

(72) Inventors: Hector Joel Castaneda, Cypress, CA (US); Jorge Ramirez, Glendale, CA (US)

(73) Assignee: White Knight Fluid Handling Inc., Kamas, UT (US)

( * ) Notice: Subject to any disclaimer, the term of this patent is extended or adjusted under 35 U.S.C. 154(b) by 300 days.

(21) Appl. No.: 16/189,250

(22) Filed: Nov. 13, 2018

(65) Prior Publication Data

US 2020/0149779 A1    May 14, 2020

(51) Int. Cl.
*F24H 9/20* (2006.01)
*G05D 23/19* (2006.01)

(52) U.S. Cl.
CPC ....... *F24H 9/2028* (2013.01); *G05D 23/1934* (2013.01)

(58) Field of Classification Search
None
See application file for complete search history.

(56) References Cited

U.S. PATENT DOCUMENTS

| | | | |
|---|---|---|---|
| 1,069,679 A * | 8/1913 | DeWallace | F24H 1/102 392/493 |
| 1,318,237 A * | 10/1919 | Sordi | F24H 1/102 392/490 |
| 3,952,182 A | 4/1976 | Flanders | |
| 4,436,983 A * | 3/1984 | Solobay | F24H 1/225 392/489 |
| 4,461,347 A * | 7/1984 | Layton | F28D 7/106 138/114 |
| 4,567,350 A * | 1/1986 | Todd, Jr. | F24H 9/2028 219/213 |
| 4,601,263 A * | 7/1986 | Shieh | F24D 17/00 122/14.3 |

(Continued)

FOREIGN PATENT DOCUMENTS

| CN | 101608832 A | 12/2009 |
|---|---|---|
| CN | 202312858 U | 7/2012 |

(Continued)

OTHER PUBLICATIONS

Korean Notice of Reasons for Rejection for Korean Application No. 10-2019-0144939, dated Sep. 21, 2020, 15 pages with English translation.

(Continued)

*Primary Examiner* — Thor S Campbell
(74) *Attorney, Agent, or Firm* — TraskBritt (57) ABSTRACT

An on-demand heater includes a plurality of heater banks disposed in series with one another between a heater fluid inlet and heater fluid outlet. Power to one or more of the heater banks is adjusted when a sensed exit fluid temperature from a heater bank differs from the partial fluid temperature increase assigned to that heater bank, such that the total desired fluid temperature increase is achieved at the heater fluid outlet in a controlled manner.

20 Claims, 6 Drawing Sheets

(56) References Cited

U.S. PATENT DOCUMENTS

| | | | | |
|---|---|---|---|---|
| 4,692,592 | A * | 9/1987 | Kale | F28D 20/0039 |
| | | | | 392/450 |
| 4,808,793 | A * | 2/1989 | Hurko | F24H 1/102 |
| | | | | 392/480 |
| 4,835,365 | A | 5/1989 | Etheridge | |
| 5,216,743 | A * | 6/1993 | Seitz | F24H 1/102 |
| | | | | 219/497 |
| 5,325,822 | A * | 7/1994 | Fernandez | F24H 1/102 |
| | | | | 122/448.3 |
| 6,178,291 | B1 | 1/2001 | Zenios et al. | |
| 6,246,831 | B1 * | 6/2001 | Seitz | F24H 9/2021 |
| | | | | 219/483 |
| 7,007,316 | B2 * | 3/2006 | Lutz, II | G05D 23/1393 |
| | | | | 4/620 |
| 7,050,706 | B2 | 5/2006 | Israelsohn et al. | |
| 7,190,894 | B2 * | 3/2007 | Chamberlain, Jr. | F24D 17/00 |
| | | | | 392/465 |
| 7,907,835 | B2 * | 3/2011 | Boussemart | F24H 9/2028 |
| | | | | 392/479 |
| 8,064,758 | B2 * | 11/2011 | Fabrizio | F24H 1/103 |
| | | | | 392/490 |
| 8,104,434 | B2 * | 1/2012 | Fabrizio | F24H 9/2028 |
| | | | | 122/40 |
| 8,306,407 | B2 * | 11/2012 | Yang | F24H 7/0433 |
| | | | | 392/308 |
| 8,744,252 | B1 * | 6/2014 | Snyder | F24H 9/1818 |
| | | | | 392/482 |
| 8,787,742 | B2 * | 7/2014 | Lutz | F24H 1/102 |
| | | | | 392/451 |
| 9,140,466 | B2 * | 9/2015 | Jurczyszak | F24H 1/105 |
| 9,341,391 | B2 * | 5/2016 | Stebbins | F24D 17/0026 |
| 2003/0021597 | A1 * | 1/2003 | Chu | F24H 9/2028 |
| | | | | 392/486 |
| 2008/0285964 | A1 * | 11/2008 | Sullivan | H05B 3/78 |
| | | | | 392/485 |
| 2012/0237191 | A1 | 9/2012 | Clark | |
| 2013/0034344 | A1 | 2/2013 | Lutz et al. | |
| 2013/0263843 | A1 | 10/2013 | Kreutzman | |

FOREIGN PATENT DOCUMENTS

| | | |
|---|---|---|
| CN | 202581840 U | 12/2012 |
| EP | 2146157 A2 | 1/2010 |
| EP | 2247894 A1 | 11/2010 |
| JP | 7217766 A | 8/1995 |
| JP | 7225052 A | 8/1995 |
| JP | 11-083174 A | 3/1999 |
| JP | 11-083175 A | 3/1999 |
| JP | 2000-220888 A | 8/2000 |
| JP | 2012-021689 A | 2/2012 |
| KR | 07-0053339 A | 5/2007 |
| KR | 16-0264400 B | 3/2016 |
| TW | 305016 B | 5/1997 |
| TW | 201321688 A | 6/2013 |
| TW | 201734387 A | 10/2017 |
| WO | 2009/100486 A1 | 8/2009 |
| WO | 2011/091032 A1 | 7/2011 |
| WO | 2011/114327 A2 | 9/2011 |
| WO | 2012/177850 A1 | 12/2012 |
| WO | 2016/160711 A1 | 10/2016 |
| WO | 2018/036653 A1 | 3/2018 |
| WO | 2018/136689 A1 | 7/2018 |

OTHER PUBLICATIONS

Taiwanese Office Action and Search Report from Taiwanese Application No. 108140823, dated Aug. 6, 2020, 18 pages.

Taiwanese Search Report from Taiwanese Application No. 108140823, dated Jul. 21, 2020, 2 pages.

Japanese Notice of Reasons for Refusal for Japanese Application No. 2019-202197, dated Nov. 18, 2020, 10 pages with English translation.

Chinese First Office Action for Chinese Application No. 201911099850.0, dated Feb. 3, 2021, 22 pages with translation.

Japanese Notice of Reasons for Refusal for Japanese Application No. 2019-202197, dated Mar. 17, 2021, 9 pages with English translation.

Korean Notice of Reasons for Rejection for Korean Application No. 10-2019-0144939, dated Mar. 24, 2021, 16 pages with English translation.

* cited by examiner

ON-DEMAND HEATER AND TEMPERATURE CONTROL SYSTEM AND RELATED PROCESS

TECHNICAL FIELD

The present invention is directed to on-demand fluid heaters. More particularly, the present invention is related to an on-demand heater having an improved control system and process for instantaneously heating fluids in a controlled manner.

BACKGROUND

On-demand heaters, also referred to as tankless, flow-through or instantaneous water heaters, are well known. Such heaters do not utilize a tank where previously heated water is stored. Instead, the water or other fluid is heated when there is a demand for the fluid, such as when fluid begins to flow through the heater in response to a demand for heated fluid, such as when turning on a faucet or the like.

A key problem with these type of heaters is that for on-demand heaters to reach their desired user temperature requirements the system power must be high as the residence time of the fluid in the heater is short. High power systems become problematic with their inability to prevent temperature overshoots at varying flow rates, or no-flow conditions, resulting from latent heat and slow response to flow and pressure changes.

On-demand or flow-through heaters are superior to conventional water heaters in high-purity processes as they eliminate the large storage or holding tanks. This is particularly important when heating high-purity fluids, such as deionized water, as the purity of the water must be maintained by eliminating bacteria growth, metal wetted parts, and particulate contamination. In a large storage tank, there will exist areas where the flow of the water is stagnant or sluggish, and bacteria can grow.

Prior art on-demand high-purity fluid or deionized water heaters rely on an output temperature sensor to make power adjustments to the heating elements. However, once the temperature of the output has fallen out of specification, it is too late, as the user's process equipment will be fed the out of specification temperature fluid, which can be problematic depending upon the manufacturing process for which the high-purity fluid is used, such as in the manufacturing of semiconductors and the like.

Accordingly, there is a continuing need for an improved on-demand water heater that is able to adjust the temperature of the heated fluid, as necessary, between the fluid inlet and fluid outlet of the heater, such that the desired end temperature of the fluid is achieved on a consistent and reliable basis. The present invention fulfills these needs, and provides other related advantages.

BRIEF SUMMARY

The present invention relates to an on-demand heater having an improved control system and process for heating and adjusting the temperature of fluids in real time as the fluid passes through the heater.

The on-demand heater generally comprises a heater fluid inlet and a heater fluid outlet. A plurality of heater banks are in fluid communication with each other and disposed in series between the heater fluid inlet and heater fluid outlet. Temperature sensors sense a temperature of an exit fluid from each heater bank. A controller is in electronic communication with the temperature sensors. The controller is configured to independently adjust a power delivered to each of the heater banks to adjust a level of heating of the fluid by each heater bank based on a comparison of the sensed exit fluid temperature of each heater bank to a partial fluid temperature increase assigned to each heater bank. Thus, a total fluid temperature increase from the heater fluid inlet to the heater fluid outlet is controllably achieved.

The heater includes a user interface for manually entering the desired in fluid temperature at the heater fluid outlet. The controller may comprise a dedicated temperature controller for each heater bank. The controller is configured to calculate the total fluid temperature increase based on a determined heater fluid inlet fluid temperature and the desired end fluid temperature. The controller is configured to calculate and assign to each heater bank a partial fluid temperature increase based on the total fluid temperature increase and the number of heater banks. The heater may also include a fluid flow or pressure sensor coupled to the controller.

The fluid may comprise ultra-pure water. Fluid contacting surfaces of the heater are comprised of one or more non-contaminating materials.

In accordance with the process of the present invention, a total fluid temperature increase through the heater is determined. A temperature of the fluid entering the heater is determined. The total fluid temperature increase is determined by comparing the temperature of the fluid entering the heater to a desired final temperature of the fluid at the heater fluid outlet. This may further comprise the step of a determination of a fluid flow rate through the heater.

A partial fluid temperature increase is assigned to each heater bank. This may be done by dividing the total fluid temperature increase by the number of the plurality of heater banks.

An exit fluid temperature at each heater bank is sensed. Power to a heater bank having a sensed exit fluid temperature that differs from the partial fluid temperature increase assigned to that heater bank is adjusted. This may be by increasing power to the heater bank when the sensed exit fluid temperature is less than the partial fluid temperature increase assigned to the heater bank. This may alternatively be by lowering power to a heater bank when the sensed exit fluid temperature is more than the partial fluid temperature increase assigned to the heater bank. The controller independently adjusts the power to the one or more heater banks. In this manner, the total fluid temperature increase is achieved at the heater fluid outlet. In addition to, or instead of, adjusting the power to the heater bank having a sensed exit fluid temperature that differs from the partial fluid temperature increase assigned to that heater bank, the controller may adjust power to one or more heater banks downstream of the heater bank having a sensed exit fluid temperature that differs from the partial fluid temperature increase assigned to that heater bank.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION

As shown in the accompanying drawings, for purposes of illustration, the present invention resides in an on-demand fluid heater, generally referred to by the reference number 10. More particularly, as will be more fully described herein, the present invention relates to an on-demand fluid heater 10 having an improved control system for more desirable power regulation to each of a plurality of heating elements within the heater 10.

More particularly, the present invention relates to an on-demand fluid heater 10 where it is expected that the fluid will enter the heater at a starting temperature, such as ambient temperature, and exit the heater at a desired temperature without the use of intervening storage tanks for the heated fluid. The heater 10 of the present invention incorporates an improved control system for multiple electric heater banks plumbed in series for instantaneously heating fluids, and more particularly the fluid flowing through the heater 10, which heating can be adjusted independently at each heater bank in real time. As such, a special demand-responsive circuit and controller automatically controls the electric power delivered to the heating elements of the respective heater banks of the heater 10.

Figure 1:
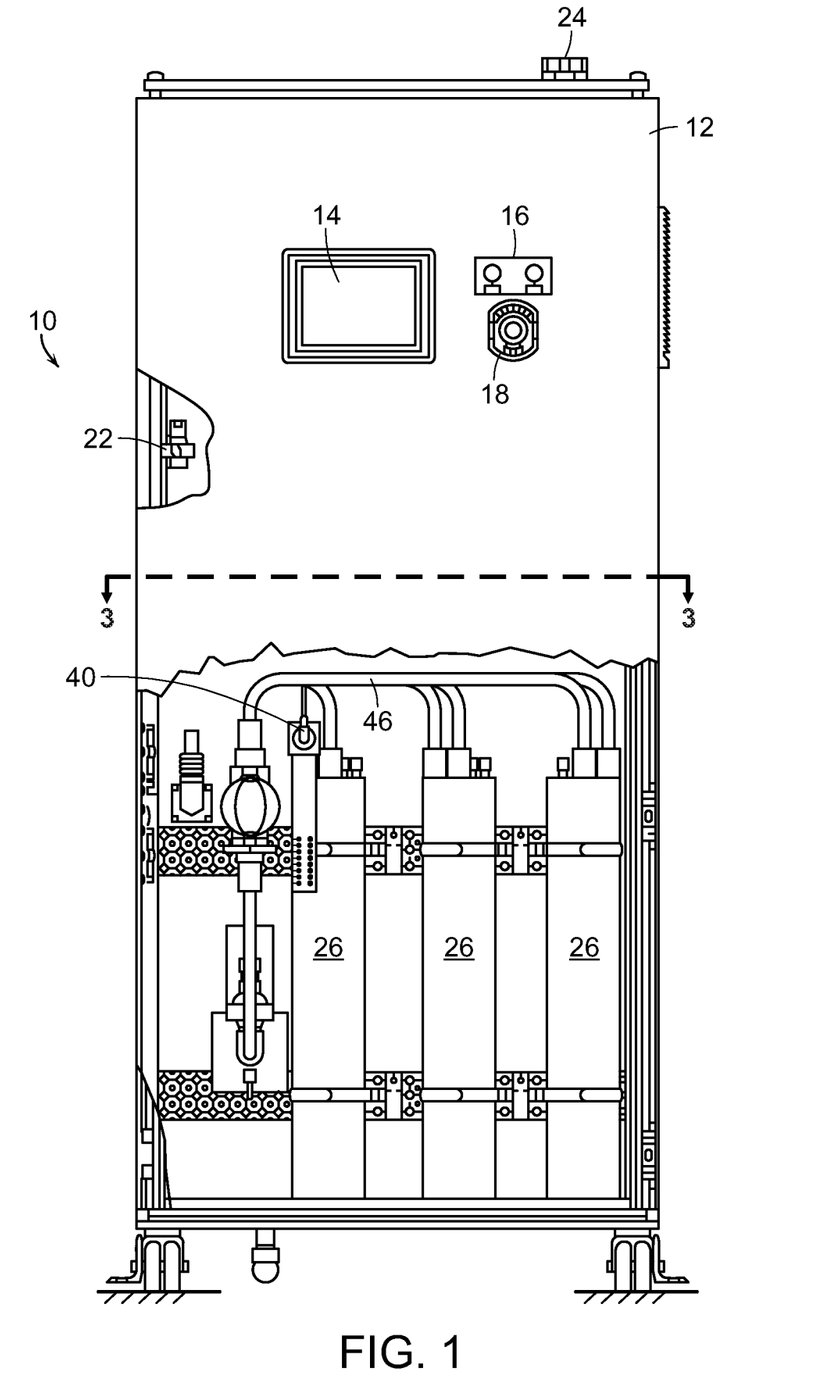
FIG. 1 is a partially cutaway front elevational view of a heater embodying the present invention.
Figure 2:
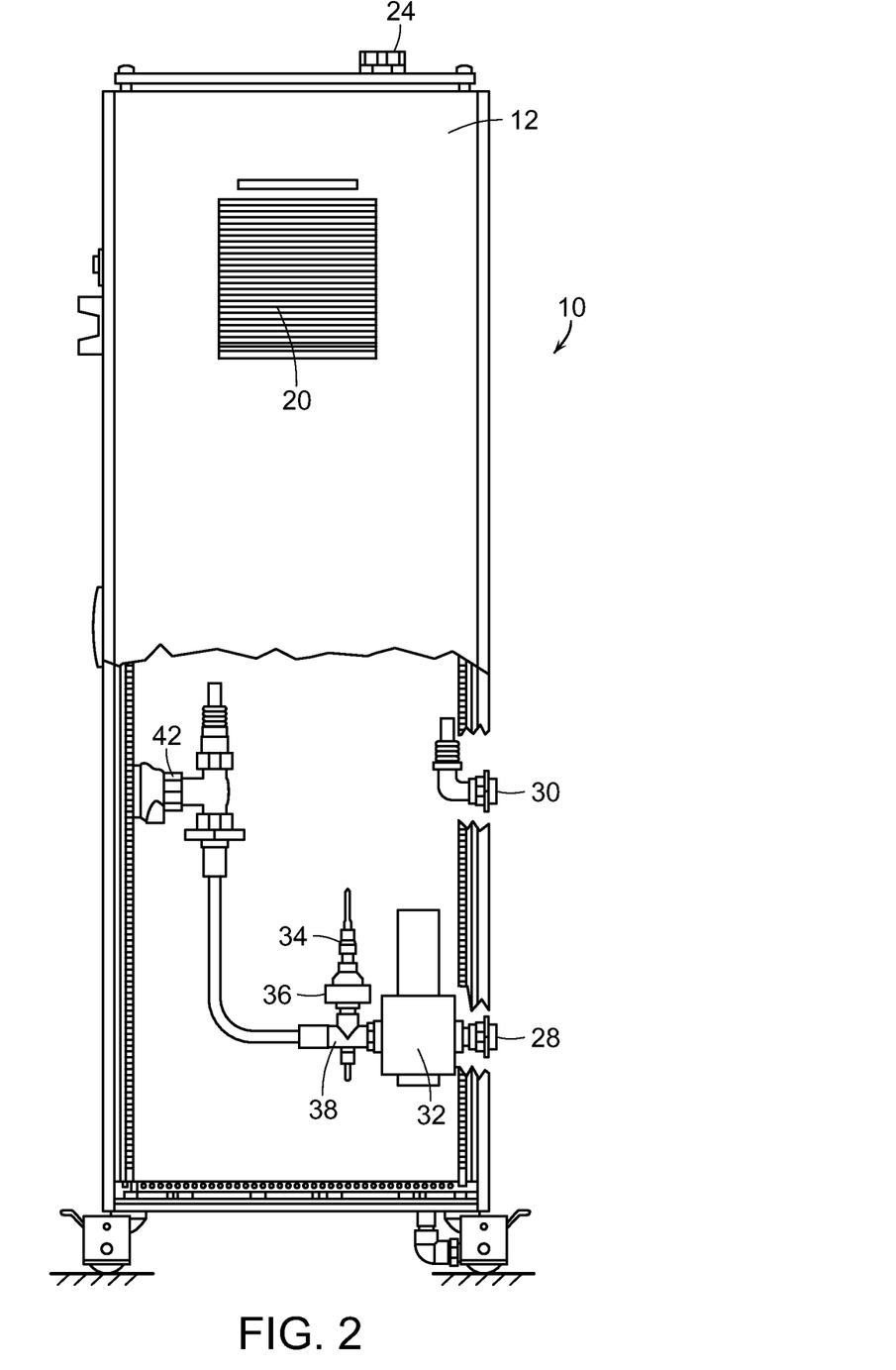
FIG. 2 is a partially cutaway side elevational view of the heater of FIG. 1
Figure 3:
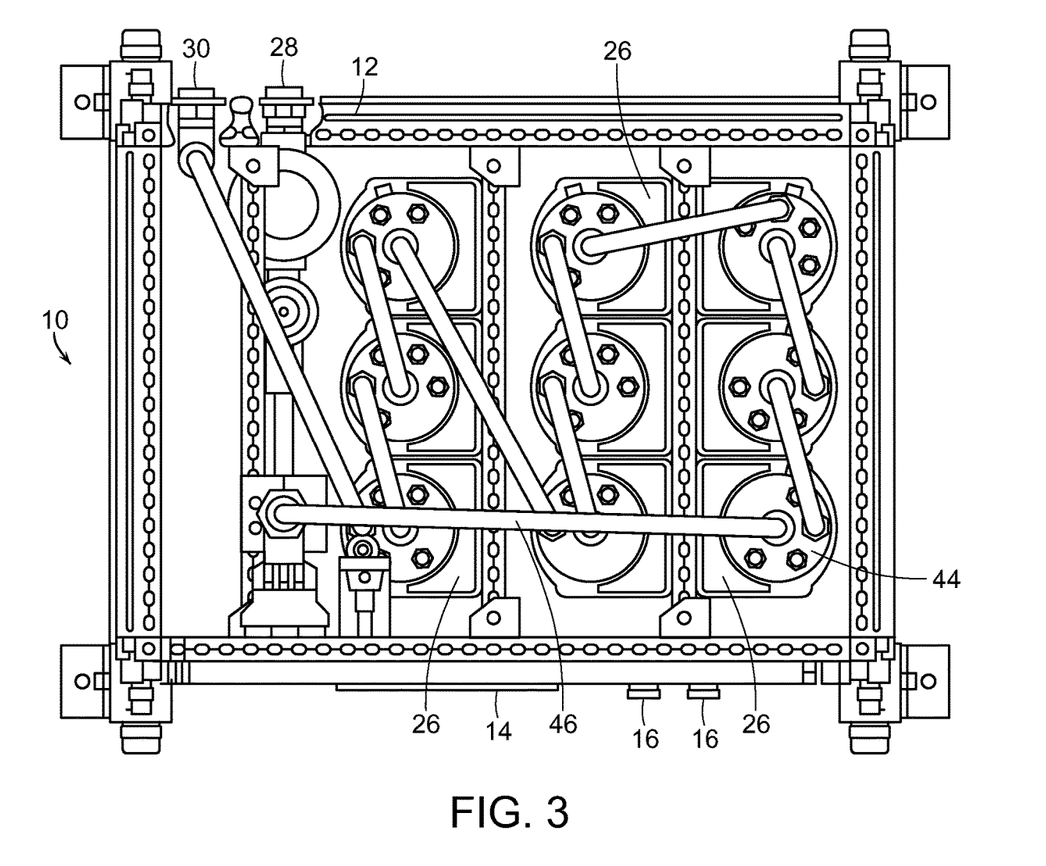
FIG. 3 is a sectioned view of the heater taken along line 3-3 of FIG. 1, illustrating a plurality of serially connected heater banks, in accordance with the present invention.

With reference now to FIGS. 1-3, a heater 10 embodying the present invention is shown. The various components of the heater 10 are housed within an enclosure 12. A user interface 14, such as a touchscreen or keypad or the like, is mounted on the enclosure housing 12 for easy access by the user. The user interface 14 enables a user to manually enter the desired temperature of the fluid exiting the heater 10, which may be referred to herein as the set point temperature (SP), which value entered in by the user is provided to a controller of the heater 10. The user interface 14 may also be used by the user to confirm that an appropriate rate of fluid is flowing through the heater 10 and that the heater is operating correctly, and provide any errors, as necessary.

Pushbuttons 16, such as those that may be illuminated by an LED or the like, may also be provided at the exterior of the housing 12 for access by the user. Such buttons may be used, for example, to turn the heater 10 on or begin its operation, or signal, such as by use of a green light or the like, that the heater 10 is in operation mode and without error. Other push buttons may be provided, such as a pushbutton that may be illuminated with a red LED for indicating that the heater 10 is in a standby mode, to temporarily pause operation of the heater 10, or the like. It will be appreciated that the illumination of the buttons 16 are for convenience of the user and the buttons or switches may not be illuminated. The heater 10 may also include an emergency off (EMO) switch or button 18, which may be used to interrupt the power supply of the heater 10 and completely power down the heater 10 in an emergency situation if the need arises.

The enclosure housing 12 contains electrical panels, a controller, and heater banks (or modules) 26 and all necessary plumbing components. The electrical panels (not shown) are kept cool with a fan and exhaust vents 20. A door interlocked sensor 22 may be incorporated into the heater 10 to detect when an enclosure door that provides access to the components within the enclosure 12 is open and provides information to a controller of the heater 10 of its condition to provide for safe operation. Incoming power to the heater system 10 may be introduced through an electrical conduit fitting 24 that extends through the enclosure housing 12.

With particular reference to FIG. 2, the heater 10 includes a fluid inlet 28 and a fluid outlet 30. For illustration purposes, FIG. 2 does not include the heater banks 26, although it will be understood that the heater banks are disposed between the fluid inlet 28 and fluid outlet 30. The heater 10 may include a pressure regulator 32, such as adjacent to the fluid inlet 28 for maintaining a generally constant fluid flow and pressure through the heater 10. A pressure transducer 34, gauge guard 36, and a thermocouple assembly 38 may also be included, typically near the fluid inlet 28. These components may be utilized to monitor and regulate the flow and pressure through the heater 10 as well as determining an incoming fluid temperature. A capacitive liquid level sensor 40 and a flow sensor 42 may also be used for these purposes and for providing such information to a controller of the heater 10. The flow sensor 42 may be in the form of a paddle wheel or the like.

With reference now to FIGS. 1 and 3, as mentioned above, a plurality of heater banks 26 are disposed serially between the heater fluid inlet 28 and heater fluid outlet 30. As illustrated in FIG. 3, each heater bank 26 may include one or more heater modules 44. The fluid enters through inlet 28 and passes through pipes 46 to each heater bank 26, as well as each heater module 44, in a sequential, serial fashion until the fluid exits through heater outlet 30. Thus, the fluid is heated in a step-wise manner as it passes through the plurality of modules 44 of the heater banks 26. As such, the fluid to be heated will enter in through the inlet 28 and pass through a first heater bank 26 and an initial or first heater module 44 of that first heater bank 26, and then sequentially pass through each heater module of that first heater bank 26, and then pass through the remaining heater banks 26 in sequential fashion until exiting from the final output heater module 44 of the final or last heater bank 26 to the outlet 30. Although a total of three heater banks 26 are shown, each having three heater modules 44, it will be appreciated that the number of heater banks and heater modules may be adjusted as needed.

The on-demand heater 10, which may also be referred to as a tankless, flow-through instantaneous water heater employs one or more chambers within the heater modules 44, or heater banks 26, which are relatively low in volume capacity and generally sized only slightly greater than the size of the internal heating elements. The small water holding volume of each chamber aids in making the heating system capable of nearly instantaneously heating the fluid flowing therethrough to a desired temperature. Moreover, the immersed heating elements within the chambers are configured for rapidly transferring electrical energy from the heating element to the fluid.

The heater system 10 of the present invention is particularly suited for an on-demand Ultra-Pure Water (UPW) system with improved temperature control. Ultra-pure water is water that has been purified or processed to very high stringent specifications. Ultra-pure water is treated to the highest levels of purity and is extensively used in the manufacturing of semiconductors and the like. A semiconductor manufacturing company uses UPW to rinse wafers after application of chemicals, to dilute the chemicals themselves, in optics systems for immersion photolithography, or as make-up to cooling fluid in some critical applications. Because the UPW or deionized water or other high purity fluid comes into direct contact with the wafers, all impurities must be removed to eliminate damage.

On-demand or flow-through heaters are superior to conventional water heaters in high purity process applications as they eliminate large storage or holding tanks. This is particularly important when heating high purity deionized water or the like because the purity of the water must be maintained by eliminating bacteria growth, metal wetted parts, and particulate contamination. In a large storage tank, there will still exist areas where the flow of the water or other fluid is stagnant or sluggish.

The heater 10 of the present invention eliminates the potential for bacteria growth by plumbing each heater bank 26 and heater module 44 in series so that each sees the same high flow rate. Moreover, the heater chambers are designed in a manner that increases fluid turbulence as the fluid flows through each chamber, eliminating any "dead-legs" in the plumbing where the purified fluid will stop flowing and remain stagnant.

The present invention may eliminate metal wetted parts by creating a heater housing with an inlet and an outlet all made of a fluoroplastic material, such as polyvinylidene fluoride (PVDF) and/or perfluoroalkoxy (PFA). The heater housing may contain a heating element jacketed in PFA. The heater sensors may also be embedded in PFA material. The heater of the present invention may include multiple heater modules 44, which are manufactured in a manner with all PDVF or PFA wetted surfaces. Preferably, there are no metal wetted surfaces, thus avoiding contamination of the deionized or purified water or other purified fluid. As mentioned above, the heater modules 44 are designed to contribute to greater fluid turbulence as it flows therethrough, eliminating dead-legs. Thus, the purity of the fluid is maintained through the heater 10.

Figure 4:
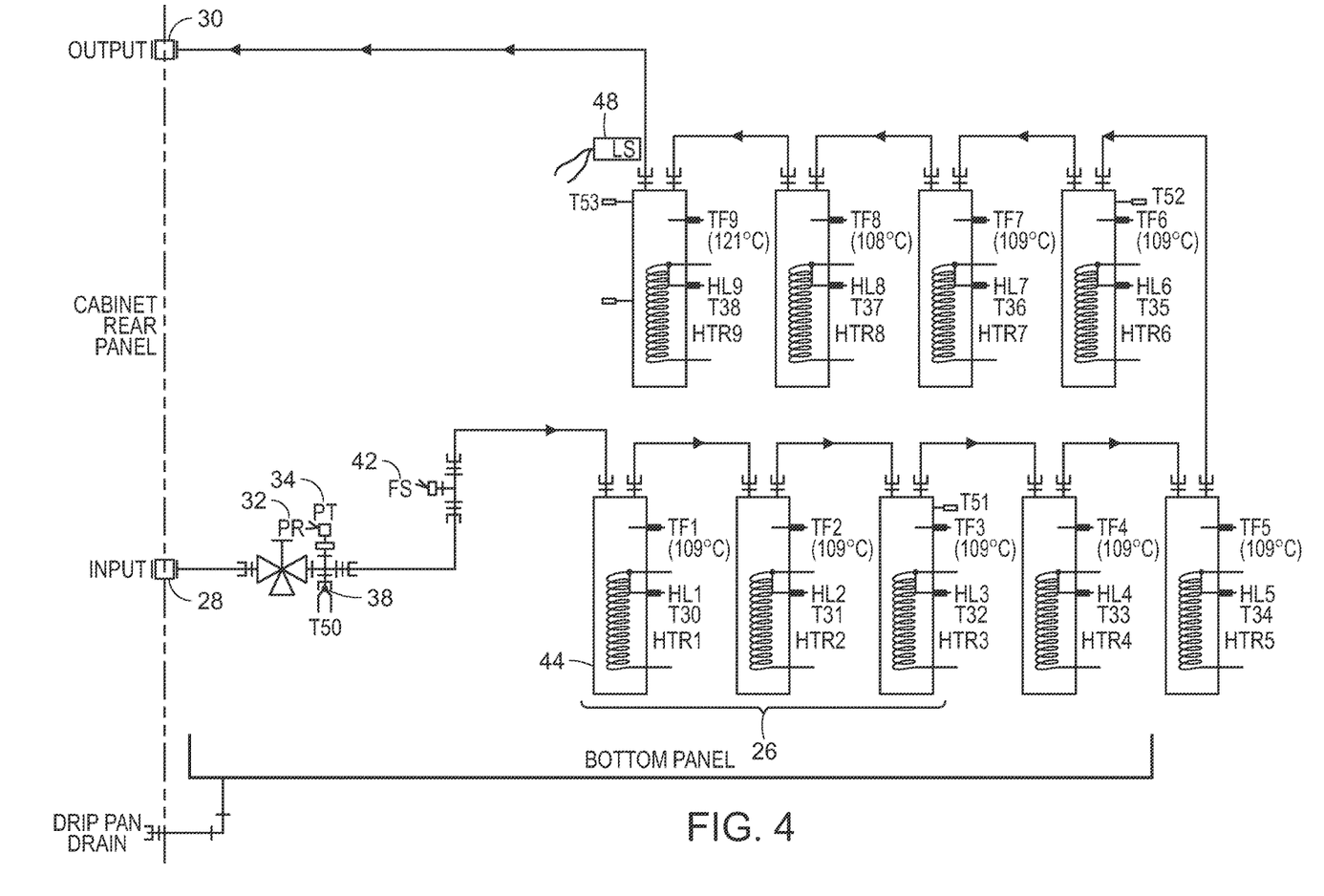
FIG. 4 is a diagrammatic view of fluid flowing through various components of the heater of the present invention.

With reference now to FIG. 4, a diagrammatic view illustrates the path of the fluid as it flows through the heater 10 of the present invention. Similar to FIG. 3, the heater 10 is illustrated as having three heater banks 26, each containing three heater modules 44, identified by HTR1-HTR9. The actual number of heater banks 26 and heater modules 44 may be varied. However, the heater banks and/or modules are plumbed in series so that each heater module 44 or bank 26 will see the maximum fluid flow rate flowing through it so that all areas for water stagnation are eliminated. The fluid, such as deionized water or other ultra-pure water, comes into the heater or system through fluid inlet 28 and then flows through a pressure regulator (PR) 32, which caps the maximum allowable fluid pressure coming into the system in a manner that even if the fluid supply comes in at high pressures, a safe internal pressure is maintained. The fluid next flows through the inlet thermocouple (T50) 38 and pressure transducer (PT) 34, which provide the incoming fluid temperature and pressure to the controller. Preferably, both sensors 34 and 38 are separated from the ultra-pure water fluid. The inlet thermocouple 38 may be encapsulated in PFA material. The pressure transducer 34 may include a gauge guard with a PFA diaphragm. The fluid then flows through a flow sensor (FS) 42 that measures the flow rate of the fluid and provides that information to the controller.

In the exemplary heater illustrated in FIG. 4, the on-demand heater has three heater banks, with the first heater bank including heater modules HTR1-HTR3, the second heater bank having heater modules HTR4-HTR6, and the third heater bank having modules HTR7-HTR9. A temperature sensor 51-53, in the form of a thermocouple (T51-T53), is adjacent the fluid output of each heater bank 26, or the final or output module of each heater bank. The thermocouple takes a reading of the fluid temperature that has exited the heater bank. Thus for example, the temperature sensor T51 measures the fluid temperature exiting the first heater bank, the temperature sensor T52 measures the temperature exiting the second heater bank, and the temperature sensor T53 measures the temperature exiting the third and final heater bank. Each of the temperature readings from these temperature sensors or thermocouples are transmitted to a controller. The fluid may pass through a sensor 48, such as a capacitive liquid level sensor (LS), before being output from the heater to ensure that there is a proper flow of fluid through the heater.

Each heater module (HTR1-HTR9) 44 may have a thermal cutoff device (TF1-TF9) and a heating element over temperature sensor (HL1-HL9) associated therewith. The thermal cutoff device will open a circuit if the fluid in the heater module reaches a predetermined unsafe temperature. The heating element over temperature sensor measures the temperature of the heating element and provides the measurement to the controller.

Figure 5:
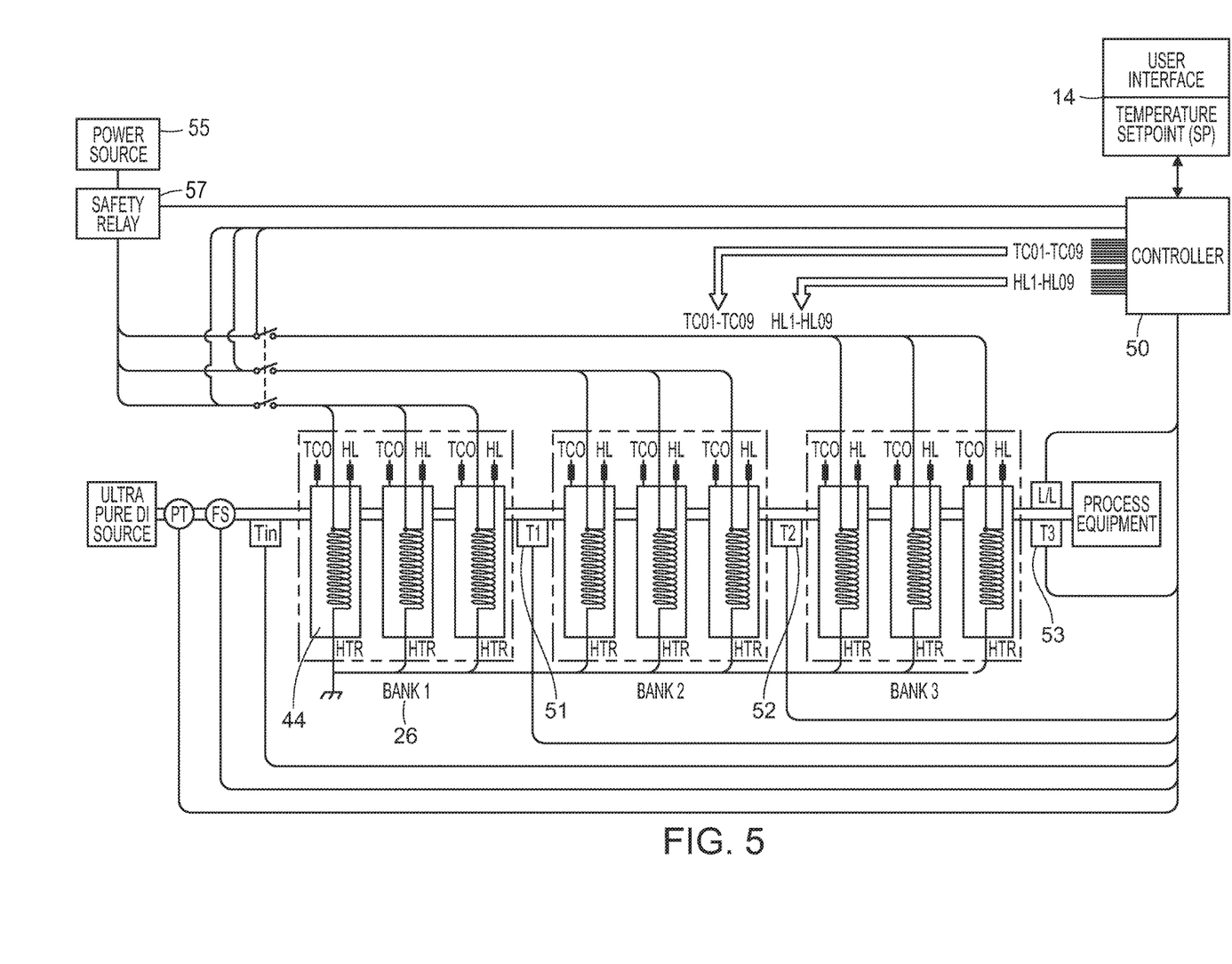
FIG. 5 is a diagrammatic view of various components of the heater, including a control system, of the present invention.

With reference now to FIG. 5, a diagram shows the fluid flow path and the interface between system sensors and heater modules and their interface with a controller 50. The fluid, such as ultra-pure deionized water, flows through the on-demand heater 10 where it reaches the desired temperature and then outputs on the on-demand heater system and flows to the process equipment after passing through the heater fluid outlet. The fluid enters the system and pressure, flow rates and incoming fluid temperature readings are continuously taken by the respective sensors, including the pressure transducer (PT), flow sensor (FS) and temperature sensor (Tin). The information from these readings is sent to the controller 50. The fluid then travels through each heater module and heater bank in series, where the complete flow of fluid coming out from one module is supplied to the next subsequent module and heater bank. In this manner, each heater module and heater bank will see the full flow rate of the system and the higher flow rates, as well as eliminating areas of plumbing that can cause stagnant fluid, thus minimizing the potential for bacteria growth or particle entrapment. A temperature sensor 51-53 (T1-T3) is placed at the fluid output of each heater bank to measure the temperature of the fluid at these corresponding areas. These temperature readings are provided to the controller 50. In this manner, the controller 50 is able to analyze and evaluate the progress that the heater banks are making in order to reach a user's desired temperature setpoint (SP) or the final fluid temperature exiting the heater. The controller 50 has independent output signals to control the power of each heater bank independently, such that each heater bank is contributing a different power to heat the fluid as it flows through the heater, if necessary. The controller 50 sends signals to the heater bank solid state relays (SSR), which then control the power output of each heater bank.

Each heater module 44 (HTR) includes a thermal cutoff device (TCO), also known as a thermal fuse, which will send a signal to the controller 50 if the fluid in the module reaches a predetermined unsafe condition. Each heater module also includes an over temperature heating sensor (HL), which measures the temperature of the heating element and sends the information to the controller 50, which will shut the safety relay 57 off, thus interrupting power from the power source 55 if unsafe temperatures of one or more heating elements is detected. The controller 50 will also shut off the safety relay 57 if high pressures, low fluid flows, or low fluid levels are detected. The incoming power source 55 provides the voltage for the on-demand heater to operate, and the safety relay 57 is preferably placed close to the incoming power to the system such that when an unsafe condition is detected the controller 50 will safely shut the power to the system down.

Prior art on-demand water heaters rely on the output temperature sensor to make power adjustments to the heaters. However, once the temperature at the output is falling out of specification, it is too late as the user's process equipment will be fed the out of specification temperature water. However, in the present invention, the temperature of the ultra-pure, deionized water or other fluid is sensed as it makes its way through the system. The controller 50 makes calculations on what temperatures should be reached at each point after each heater bank 26 based upon the user end temperature set point, flow rates and incoming fluid temperature. The present invention evaluates the fluid temperature progress as it comes out of each heater bank 26 to determine whether the temperature is at where it should be, and makes adjustments to an individual heater bank if it is not. For example, power may be increased to a heater bank when the sensed exit fluid temperature from that heater bank is less than the partial fluid temperature increase assigned to that heater bank. Conversely, power may be decreased or lowered to the heater bank when the sensed exit fluid temperature from the heater bank is more than the partial fluid temperature increase assigned to that heater bank. Additionally, or alternatively, power may be increased to one or more downstream heater banks when the sensed exit fluid temperature from an upstream heater bank is less than a partial fluid temperature increase assigned to that upstream heater bank; and conversely, the power may be lowered to one or more downstream heater banks when the sensed exit fluid temperature is more than a partial fluid temperature increase assigned to the upstream heater bank. In this manner, the response of the heater system is faster and more accurate and consistent fluid temperatures are obtained.

Figure 6:
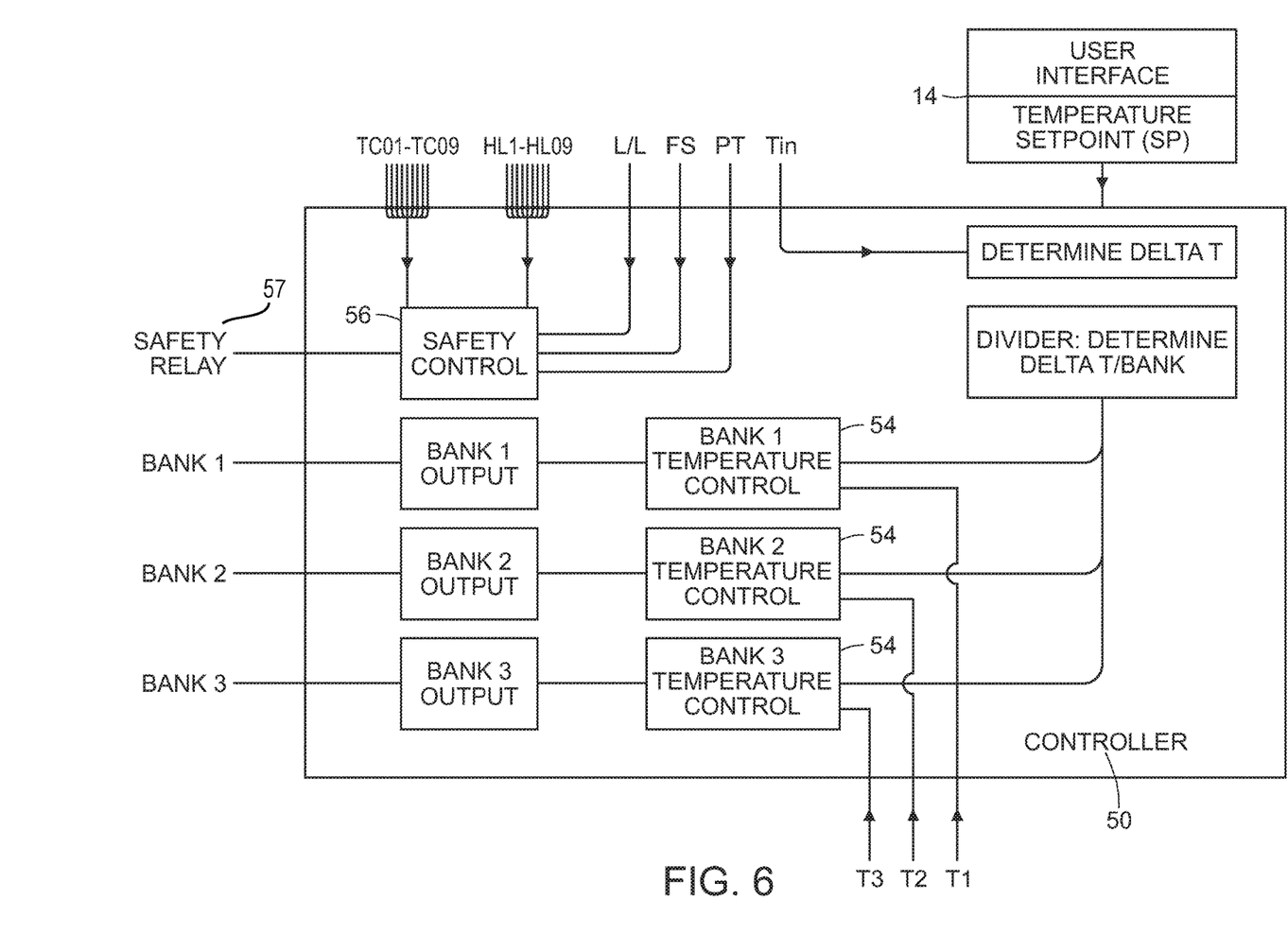
FIG. 6 is a diagrammatic view of a controller and control system used in accordance with the present invention.

With reference now to FIG. 6, a diagram is provided of the control system and its operation. The control system has a user interface 14, such as a touchscreen or pushbuttons or the like, that allows the user the ability to enter in their desired final water temperature, also known as the set point temperature (SP). This is manually entered by the user and the value is provided to the controller 50. The controller 50 determines the total fluid temperature increase, also referred to as the Required Delta Temperature, the heater must provide by subtracting the value of the input temperature sensor (Tin) 38 reading from the SP. This value is the amount of degrees that the on-demand heater needs to bring up the fluid as it flows through the heater in order to meet the user's requirements.

The controller 50 also has the means to determine a partial fluid temperature increase or Delta T to be assigned to each heater bank. The controller 50 has a divider that divides the Required Delta Temperature or total fluid temperature increase through the heater by the number of heater banks in the heater system. This results in a Delta T per heater bank, also referred to herein as a partial fluid temperature increase, which is assigned to each heater bank. This value is transmitted to each separate and independent bank temperature control, which will regulate the power to its respective heater bank. As the exemplary illustrative heater comprises three heater banks, three bank temperature controls 54 are illustrated in FIG. 6, although the number will vary depending upon the number of heater banks as in a particularly preferred embodiment each heater bank has an independent bank temperature control associated therewith. Each bank temperature control 54 compares the Delta T/bank or partial fluid temperature increase target provided with the temperature reading of the fluid at the output of the heater bank by temperature sensor 51-53. Each bank temperature control 54 regulates the temperature of the fluid at each respective heater bank, and therefore is able to better respond faster to changes in flow, pressure, and when sensed exit fluid temperatures from a heater bank differ from the partial fluid temperature increase assigned to that heater bank or the Delta T assigned to that heater bank. In contrast to the prior art, the bank temperature controls 54 respond to the immediate, local conditions at each heater bank, and are not delayed until the fluid is at the system output.

Prior art on-demand water heaters rely on the output temperature sensor to make power adjustments to the heaters. Once the temperature at the output has fallen out of specification, it is too late, as the user's process equipment will receive the fluid that is out of specification temperature. The present invention provides means for sensing the temperature of the fluid as it makes its way through the system, with the controller making calculations on what temperature should be at each point based upon the total fluid temperature increase through the heater as determined by the difference between the user set point or final fluid temperature and the temperature of the incoming fluid, as well as fluid flow rates through the heater. The present invention evaluates the fluid temperature progress as it comes out of each heater bank 26 to determine whether the temperature is at where it should be, and can make adjustments to individual heater banks if it is not. In this manner, the response of the heater system is faster and more accurate and consistent fluid temperatures exiting the heater are obtained.

Each heater bank 26 has an independent bank temperature controller 54 operably coupled thereto, which compares the heater bank fluid output temperature readings with the expected Delta T/bank temperature or partial temperature increase that is assigned to that heater bank. If the temperature is below the expected temperature, the bank temperature control 54 will adjust its signal to the heater bank output, which signals the SSR controlling the heater bank. Thus, temperature adjustments, by either increasing or reducing the power provided to each heater bank, is adjusted in near real time.

As mentioned above, safety sensors, including a liquid level sensor, flow rate sensor, pressure transducer, the heater thermal cutoff devices (TC01-TC09) and over temperature sensors on the heating elements (HL1-HL9) send their readings to a safety control 56, which will signal the safety relay 57 to shut down the heater power if an unsafe condition is detected.

Although several embodiments have been described in detail for purposes of illustration, various modifications may be made without departing from the scope and spirit of the invention. Accordingly, the invention is not to be limited, except as by the appended claims.

What is claimed is:

1. A process for on-demand heating of fluid, comprising the steps of:
   providing a heater having a plurality of heater banks disposed serially between a heater fluid inlet and a heater fluid outlet;

determining a total fluid temperature increase through the heater;

assigning a partial fluid temperature increase to each heater bank of the plurality of heater banks;

sensing an exit fluid temperature at each heater bank of the plurality of heater banks; and adjusting power to at least two heater banks of the plurality of heater banks, the at least two heater banks comprising:

at least one upstream heater bank having a sensed exit fluid temperature that differs from the partial fluid temperature increase assigned to that the at least one upstream heater bank; and at least one downstream heater bank downstream of the at least one upstream heater bank, wherein adjusting power to the at least one downstream heater bank is based on a comparison of the sensed exit fluid temperature from the at least one upstream heater bank to the partial fluid temperature increase assigned to the at least one upstream heater bank;

whereby the total fluid temperature increase is achieved at the heater fluid outlet.

2. The process of claim 1, further comprising determining a temperature of the fluid entering the heater.

3. The process of claim 2, wherein determining a total fluid temperature increase through the heater comprises comparing the temperature of the fluid entering the heater to a desired final temperature of the fluid at the heater fluid outlet.

4. The process of claim 3, wherein determining a total fluid temperature increase through the heater comprises a determination of a fluid flow rate through the heater.

5. The process of claim 1, wherein adjusting power to at least two heater banks of the plurality of heater banks comprises increasing power to the at least one upstream heater bank when the sensed exit fluid temperature of the at least one upstream heater bank is less than the partial fluid temperature increase assigned to the at least one upstream heater bank.

6. The process of claim 1, wherein adjusting power to at least two heater banks of the plurality of heater banks comprises lowering power to the at least one upstream heater bank when the sensed exit fluid temperature of the at least one upstream heater bank is more than the partial fluid temperature increase assigned to the at least one upstream heater bank.

7. The process of claim 1, wherein assigning a partial fluid temperature increase to each heater bank of the plurality of heater banks comprises the step of dividing the total fluid temperature increase by the number of heater banks of the plurality of heater banks.

8. The process of claim 1, further comprising detecting a fluid flow or pressure through the heater.

9. The process of claim 1, wherein adjusting power to at least two heater banks of the plurality of heater banks comprises a controller independently adjusting power to the at least two heater banks.

10. The process of claim 1, further comprising passing ultra-pure water through the heater, wherein surfaces of the heater contacting the ultra-pure water comprise one or more non-contaminating materials.

11. The process of claim 1, wherein adjusting power to at least two heater banks of the plurality of heater banks comprises increasing power to the at least one downstream heater bank when the sensed exit fluid temperature of the at least one upstream heater bank is less than the partial fluid temperature increase assigned to the at least one upstream heater bank.

12. The process of claim 1, wherein adjusting power to at least two heater banks of the plurality of heater banks comprises decreasing power to the at least one downstream heater bank when the sensed exit fluid temperature of the at least one upstream heater bank is more than the partial fluid temperature increase assigned to the at least one upstream heater bank.

13. An on-demand heater, comprising:

a heater fluid inlet and a heater fluid outlet;

a plurality of heater banks comprising at least one upstream heater bank and at least one downstream heater bank downstream of the at least one upstream heater bank, the plurality of heater banks in fluid communication with each other and disposed in series between the heater fluid inlet and heater fluid outlet;

temperature sensors for sensing an exit temperature of a fluid from each heater bank of the plurality of heater banks; and a controller in electronic communication with the temperature sensors, the controller being configured to adjust power delivered to the at least one upstream heater bank and the at least one downstream heater bank based on a comparison of the exit temperature of the fluid from the at least one upstream heater bank to a partial fluid temperature increase assigned to the at least one upstream heater bank;

wherein a total fluid temperature increase from the heater fluid inlet to the heater fluid outlet is controllably achieved.

14. The heater of claim 13, wherein the fluid comprises ultra-pure water and fluid contacting surfaces of the heater comprise one or more non-contaminating materials.

15. The heater of claim 13, further comprising a fluid flow or pressure sensor coupled to the controller.

16. The heater of claim 13, wherein the controller comprises a dedicated temperature controller for each heater bank.

17. The heater of claim 13, further comprising a user interface for manually entering a desired end fluid temperature at the heater fluid outlet.

18. The heater of claim 17, wherein the controller is configured to calculate the total fluid temperature increase based on a determined heater fluid inlet fluid temperature and the desired end fluid temperature.

19. The heater of claim 18, wherein the controller is configured to calculate and assign to each heater bank a partial fluid temperature increase based on the total fluid temperature increase and the number of heater banks.

20. The heater of claim 13, wherein the controller is configured to increase power delivered to one or more heater banks of the at least one upstream heater bank and the at least one downstream heater bank when the exit fluid temperature of the at least one upstream heater bank is less than the partial fluid temperature increase assigned to the at least one upstream heater bank.

* * * * *

UNITED STATES PATENT AND TRADEMARK OFFICE
CERTIFICATE OF CORRECTION

PATENT NO. : 11,060,764 B2
APPLICATION NO. : 16/189250
DATED : July 13, 2021
INVENTOR(S) : Hector Joel Castaneda et al.

Page 1 of 1

It is certified that error appears in the above-identified patent and that said Letters Patent is hereby corrected as shown below:

In the Claims
Claim 1,　　Column 9,　　Line 12,　　change "to that the" to --to the--

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*